United States Patent [19]

Stephenson

[11] Patent Number: 4,637,826

[45] Date of Patent: Jan. 20, 1987

[54] FABRIC FILTER SHAKER ASSEMBLY

[75] Inventor: Robert G. Stephenson, Panania, Australia

[73] Assignee: James Howden Australia Pty. Limited, Australia

[21] Appl. No.: 736,351

[22] Filed: May 21, 1985

[30] Foreign Application Priority Data

May 21, 1984 [AU] Australia .............................. PG5090

[51] Int. Cl.⁴ .............................................. B01D 46/04
[52] U.S. Cl. ........................................ 55/304; 55/378; 55/DIG. 26
[58] Field of Search ................. 55/304, 378, 504, 508, 55/DIG. 26, 305

[56] References Cited

U.S. PATENT DOCUMENTS

| | | | |
|---|---|---|---|
| 2,732,030 | 1/1956 | Dorfan | 55/304 |
| 3,572,012 | 3/1971 | Martin et al. | 55/304 |
| 4,113,455 | 9/1978 | Richmond | 55/378 |
| 4,123,027 | 10/1978 | Huntington | 55/378 X |
| 4,152,127 | 5/1979 | Kennedy | 55/304 |
| 4,217,117 | 8/1980 | Syverson | 55/304 |

Primary Examiner—Charles Hart

[57] ABSTRACT

In a mechanical shake type fabric filter having a reciprocable shaker rack (10), a plurality of filter bag support caps (14) suspended from the shaker rack (10) and a fabric filter bag (11) suspended from each cap (14), the improvement that each cap (14) has a staple (16) formed on its upper surface which is releasably engaged with a hook (19) formed on the lower end of a support bar (17) which extends vertically through an aperture (18) in the shaker rack. The bar (17) may be retained in any vertical position relative to the shaker rack (10) by a spring clip (22) which is slidably positioned on the bar (17) but is deformed so as to frictionally engage the bar (17) when it contacts the shaker rack (10).

The arrangement allows rapid adjustment of bag tension and simplified bag replacement.

7 Claims, 2 Drawing Figures

FABRIC FILTER SHAKER ASSEMBLY

The present invention relates to fabric filters and more particularly means for supporting fabric filter bags in mechanical shake type fabric filters.

Fabric filters are used in industry, power generation installations and elsewhere to remove particulate matter such as dust, fly ash and the like from gas streams. The gas stream is passed through a fabric filter bag made of a woven or felted fabric and the particulate matter retained therein while the cleaned gas stream passes through the bag. In mechanical shake type fabric filters the gas stream is passed upwardly into a fabric filter bag having an open bottom end. The particulate matter accumulated in the bag must be periodically removed and in mechanical shake type fabric filters this is done by stopping the gas flow and shaking the bags to cause the particulate matter to pass out of the fabric filter bags through the open bottom thereof into a hopper from which the particulate matter may be removed and disposed of.

The upper end of fabric filter bags for use in mechanical shake type fabric filters commonly open ended and connected to an imperforate cap of circular or oval shape which cap is in turn connected to a supporting shaker rack. The shaker rack serves the dual function of supporting the fabric filter bags and, when it is reciprocated, shaking the bags to remove the accumulated particulate matter therefrom.

A problem encountered with conventional mechanical shake type fabric filters wherein filter bag support caps are used is that the existing designs do not allow for both rapid and simple adjustment of the tension in individual fabric filter bags and for easy replacement of individual bags. The present invention is designed to provide an improvement to existing fabric filters of the mechanical shake type by overcoming these problems encountered with existing designs.

The present invention consists in a mechanical shake type fabric filter having a reciprocable shaker rack, a plurality of filter bag support caps suspended from the shaker rack and a fabric filter bag suspended from each cap, of the improvement comprising the connection of each support cap to the shaker rack by a substantially vertically disposed support member, each support member extending through an aperture in the shaker rack and having at its lower end connection means releasably connected to the support cap, positioning means being provided to releasably retain the support member in at least any one of a number of desired vertical positions relative to the shaker rack.

Each support cap preferably comprises a circular or oval base and a continuous upwardly extending side wall around the periphery of the base. A fabric filter bag is preferably clamped to the side wall of each support cap by a circular spring or a hose type clamp of conventional design.

The support member preferably comprises a rectangular section steel bar having a hook formed at its lower end. The hook is preferably formed by bending the lower end of the support member through an acute angle about a line lying in the plane of the bar and perpendicular to the longitudinal axis of the support member. The upper face of the base of each support cap is preferably provided with an inverted U-shaped staple extending across the centre of the base. This staple may then engage with the hook on the lower end of the support member. The support cap may then be removed from the support member by unhooking it therefrom at any time provided that the fabric filter bag is not tensioned. The adjustment of the tension in the fabric filter bag will be hereinafter described.

The preferred arrangement described in the previous paragraph allows the support cap to pivot, or swing slightly relative to its associated support member however only about the line along which the support member has been bent to form the hook. In use it is desirable that the shaker rack is reciprocated along a path substantially at right angles to the abovementioned line. A corollary of this preferred orientation is that all of the bar like support members should be aligned and lie in a plane at right angles to the reciprocation path of the shaker rack. The apertures in the shaker rack through which the support members extend should thus also be aligned.

Each support member is releasably retained at least in any one of a number of desired vertical positions relative to the shaker rack by the positioning means. In one embodiment the positioning means may comprise a pin or like member which may be inserted into any one of a number of shake holes spaced apart along the length of the support member when that hole is exposed above the aperture in the shaker rack. In this embodiment of the invention a fabric filter bag is tensioned by raising the support member to which that bag is connected until the bag is appropriately tensioned and inserting the pin into the hole in the support member next above the shaker rack.

In more preferred embodiments of the invention the positioning means is such that the support member may be retained in any vertical position relative to the shaker rack. In a particularly preferred arrangement the positioning means comprises a spring clip slidably disposed on the support member. The spring clip is such that when the support member is raised to a desired position relative to the shaker rack and the spring clip is pushed down against the support rack the weight of the support member will cause the spring clip to deform slightly and frictionally engage the support member such that it cannot move relative to the shaker rack. The spring clip most preferably is formed from flat steel strip and is of a substantially invented "V" shape. One arm of the spring clip includes an elongate slot through which a bar-shaped support member projects with only a small clearance, the axis of the aperture extends substantially parallel to the spring clip. The other arm of the spring clip is tapered inwardly towards its free end which contacts the shaker rack at a point off-centre relative to the longitudinal axis of the slot. The assymetric contact between the spring clip and the shaker rack will cause the spring clip to cant over slightly on making contact with the shaker rack and bind against the support member. If the support member is raised slightly the spring clip will be freed from contact with the shaker rack and will resume its normal shape. The spring clip may be then slid freely along the support member as the bag is tensioned or detensioned.

The upper end of the support member is preferably provided with stop means to prevent it sliding downwardly completely through the aperture in which it slides in the shaker rack. This stop means may also be engageable by a person seeking to adjust the vertical positions of the support member relative to the shaker rack. Most preferably the stop means comprises a ring connected to the support member through a hole in the upper end thereof.

Hereinafter given by way of example only is a preferred embodiment of the present invention described with reference to the accompanying drawings, in which:

FIG. 1 shows a beam 10 forming part of the shaker rack of a mechanical shake type fabric filter and one fabric filter bag 11 therefor.

Figure 1:
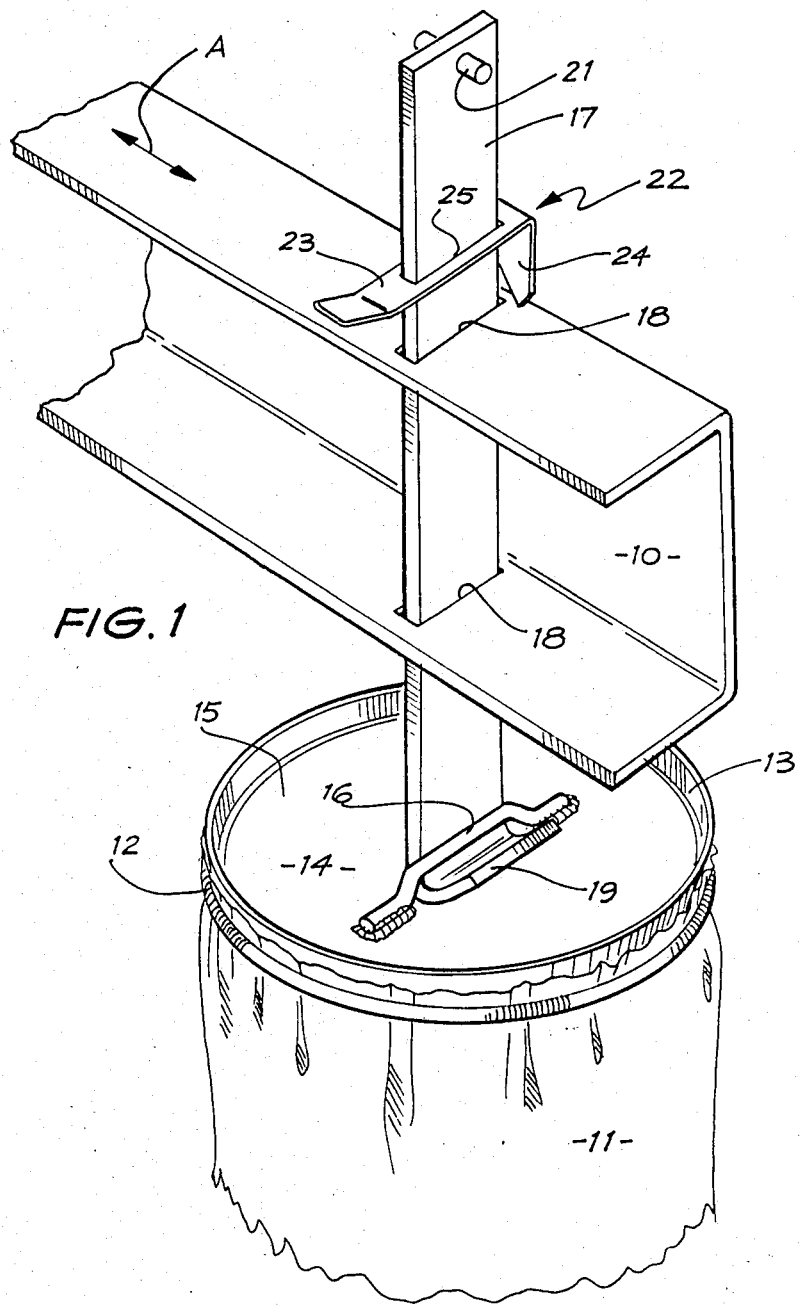
FIG. 1 is a perspective view of a part of a mechanical shake type fabric filter showing the improvement according to a first embodiment of the invention.

The fabric filter bag 11 is circular in cross section and formed of a woven fabric. The lower end of the bag 11 (not shown) is connected in a conventional manner to a gas inlet thimble (not shown). The upper end of the bag 11 is clamped by a spring clamp 12 to the upstanding peripheral wall 13 of a circular cap 14. The cap 14 is formed at the centre of its base 15 with an inverted U-shaped staple 16 which is welded at either end to the base 15 of the cap 14.

The cap 14 is supported from the beam 10 by a support bar 17. The bar 17 is of rectangular cross sectional shape and extends through a pair of vertically aligned slots 18 in the beam 10 which are disposed at right angles to the direction of reciprocation of the shaker rack, and thus of beam 10, which is indicated by arrow A. The lower end of the support bar 17 has been formed into a hook 19 by being bent through an acute angle along a line lying in the plane of the bar 17 and at right angles to the longitudinal axis thereof. The hook 19 is hooked through the staple 16 on the cap 14. At the upper end of the support bar 17 is a pin 21 extending through the bar 17 at right angles thereto and constituting stop means.

A spring clip 22 is slidably disposed on the support bar 17 between the beam 10 and the pin 21. The spring clip 22 is formed from a strip of spring steel bent into an inverted V shape and having two arms 23 and 24 extending from its apex. The arm 23 includes a rectangular slot 25 which closely surrounds the bar 17 which projects through it. The arm 24 tapers to a point at its free end which point is offset from the axis of the slot 25.

The tension in the bag 11 may be adjusted by raising the bar 17 to at least clear the spring clip 22 from the beam 10 and then sliding the clip 22 upwardly (if the bag 11 is to be detensioned) or downwardly (if the bag 11 is to be tensioned). When the bar 17 is released the point of the arm 24 of spring clip 22 will again contact the beam 10. The assymetric position of the point relative to the axis of slot 25 will cause the clip 22 to cant over sideways and the sidewalls slot 25 will bind against the bar 17 preventing any downward motion thereof relative to the beam 10.

If the bag 11 is to be removed from the shaker rack completely the bag 11 is first detensioned as described and the cap 14 is unhooked from the hook 19 on bar 17.

Figure 2:
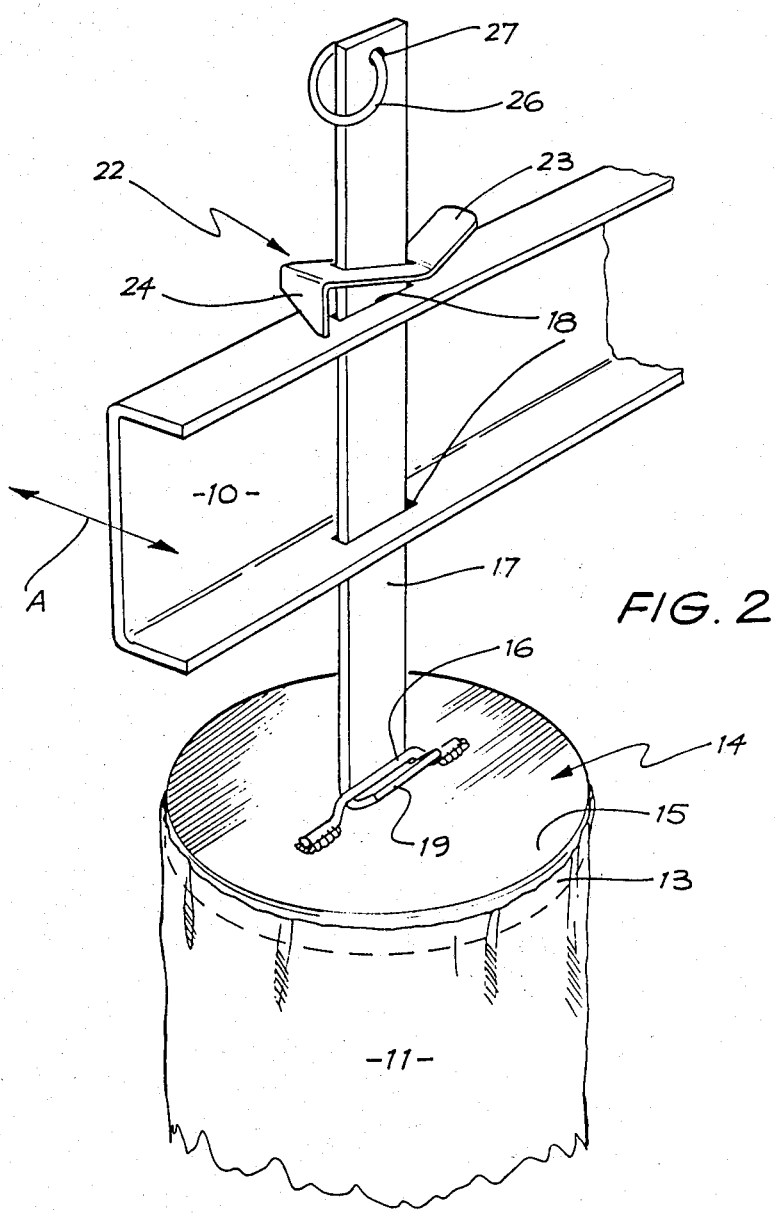
FIG. 2 is a perspective view of a part of a mechanical shake type fabric filter showing the improvement according to a second embodiment of the invention.

FIG. 2 shows an arrangement similar to that described with reference to FIG. 1 and the same numeric designations is used for similar parts. The arrangement of FIG. 2 differs from that of FIG. 1 in a number of respects and there will now be described.

The flange 13 of cap 14 extends downwardly from base 14 and the bag 11 is retained thereon by a hose type clamp (not shown).

The slots 18 are parallel to the axis of beam 10 rather than tranverse to it however it will be noted that these slots are still arranged at right angles to the axis of reciprocation of the shaker rack as shown by arrow A.

The stop means is constituted by a closed ring 26 which extends through a hole 27 in the upper end of the bar 17.

In use the arrangement of FIG. 2 is used as has been described with reference to FIG. 1.

I claim:

1. In a mechanical shake type fabric filter having a reciprocable shaker rack, a plurality of filter bag support caps suspended from the shaker rack and a fabric filter bag suspended from each cap, the improvement comprising the connection of each support cap to the shaker rack by a substantially vertically disposed support member, each support member extending through an aperture in the shaker rack and having at its lower end connection means releasably connected to the support cap, and positioning means being provided to releasably retain the support member in at least any one of a number of desired vertical positions relative to the shaker rack, characterized in that the positioning means comprises only a spring clip formed of spring steel and slidably disposed on the support member, the spring clip being of an inverted "V" shape having two arms extending from the apex, the support member extending through an aperture in one arm and the other arm having its free end positioned out of alignment with an axis of symmetry of the aperture so that upon that free end contacting the shaker rack the clip will be caused to deform and the side walls of the aperture frictionally engage the support member.

2. In a mechanical shake type fabric filter as claimed in claim 1 the further improvement in which the support member is a rectangular-section bar the lower end of which is bent through an acute angle about a line lying in the plane of the bar and at right angles to the longitudinal axis of the bar to form a hook constituting the connection means.

3. In a mechanical shake type fabric filter as claimed in claim 2 the further improvement in which the cap is formed on its upper surface with an inverted V-shaped staple for connection to the hook on the bar.

4. In a mechanical shake type fabric filter as claimed in claim 2 or claim 3 the further improvement in which the bar lies in a plane substantially at right angles to the axis of reciprocation of the shaker rack.

5. In a mechanical shake type fabric filter as claimed in claim 1 the further improvement in which the positioning means are such that the support member may be releasably retained in any desired vertical position along its length relative to the shaker rack.

6. In a mechanical shake type fabric filter as claimed in claim 1 the further improvement in which a stop member is positioned at the upper end of the support member.

7. In a mechanical shake type fabric filter as claimed in claim 6 the further improvement in which the stop means comprises a closed ring extending through a hole in the upper end of the support member.

* * * * *